United States Patent [19]

Snelling et al.

[11] 4,424,523

[45] Jan. 3, 1984

[54] READ/WRITE BAR FOR MULTI-MODE REPRODUCTION MACHINE

[75] Inventors: Christopher Snelling, Penfield; Martin E. Banton, Fairport, N.Y.

[73] Assignee: Xerox Corporation, Stamford, Conn.

[21] Appl. No.: 394,601

[22] Filed: Jul. 2, 1982

[51] Int. Cl.³ .................. G01D 15/06; H04N 1/04
[52] U.S. Cl. .................... 346/160; 346/107 R; 358/286
[58] Field of Search ............... 346/160, 107 R; 354/5, 354/12; 358/286, 300

[56] References Cited

U.S. PATENT DOCUMENTS 3,850,517 11/1974 Stephany et al. ............... 354/12
4,202,000 5/1980 Carballes ...................... 357/19
4,217,597 8/1980 Hirtz ........................... 357/19
4,317,137 2/1982 Tompkins ...................... 358/286

Primary Examiner—Thomas H. Tarcza
Attorney, Agent, or Firm—Frederick E. McMullen

[57] ABSTRACT

A dual mode reproduction machine or copier incorporating a full width read/write bar having at least one linear array of LEDs for selectively illuminating and scanning a document original in a read mode or exposing the copier photoreceptor in a write mode. A Selfoc lens array provides a lens element for focusing each LED, the rear/write bar and lens array being combined in a unitary structure mounted for selective movement between a read and write position.

19 Claims, 7 Drawing Figures

READ/WRITE BAR FOR MULTI-MODE REPRODUCTION MACHINE

The invention relates to a multi-mode reproduction machine, and more particularly to a full width image read/write bar for use in machines of this type.

Typical reproduction machines such as xerographic type copiers may be classified as single mode machines in that machines of this type commonly have just one function, namely to produce copies from document originals. And, while machines of this type may come in a variety of designs, operate at various speeds, and incorporate various and sundry aids such as document handlers, they remain a single mode machine.

Recently, interest has arisen in multi-mode machines, namely, reproduction machines or copiers that in addition to or in lieu of performing the usual copying function also are capable of reading a document image and converting the image to electrical signals or pixels, which then may be stored in memory, transmitted to a remote site via a suitable data communication channel, etc. And as a further supplemental or alternate mode, capable of writing images on the machine imaging member in accordance with an image signal or pixel input from a suitable source which may as in the case of the reading mode discussed above, comprise a memory, data communication channel, etc. However, attempts to provide machines combining one or both of these additional operating functions or modes have been handicapped by problems of greatly increased expense and complexity, problems which have mitigated against the commercial acceptance of machines of this type. For example, one type of image writing system requires a high intensity beam of light which normally requires the use of a relatively expensive laser. But further, a relatively sophisticated optical system is needed; an optical system which requires in addition to the usual lenses and mirrors, a device such as a rotating polygon to scan the light beam across the machine imaging element and a modulator such as an acousto-optical type modulator to modulate the beam in accordance with the content of the image signal or pixel input. Coupled with this is the need for complex and expensive electronic circuitry for operating the writing mechanism in timed synchronization with the reproduction machine or copier with which it is associated which often requires the use of large amounts of relatively expensive memory.

The invention seeks to permit a simpler, less expensive multimode apparatus capable of reading a document original and converting the image to electrical signals or pixels, or of writing image copies in response to an image signal input, and provides a combined document reading, illuminating, and writing means for either scanning a document to provide image signals representative of the document image or scanning an imaging member to expose the imaging member in accordance with an image signal input and write images represented by the image signal input on said imaging member, comprising in combination: a substrate; plural light emitting and light sensing scanning elements on the substrate, the scanning elements being arranged on the substrate in at least one linear array capable of either scanning a document or scanning the imaging member; and control means for operating first ones of the elements as light emitters for illuminating a line-like portion of the document and the remaining second ones of the elements as image sensors for scanning the document illuminated portion and converting the document image to image signals or for operating both the first and second ones of the elements as selectively actuable light emitters for exposing the imaging member in accordance with the image signal input.

IN THE DRAWINGS

Figure 1:
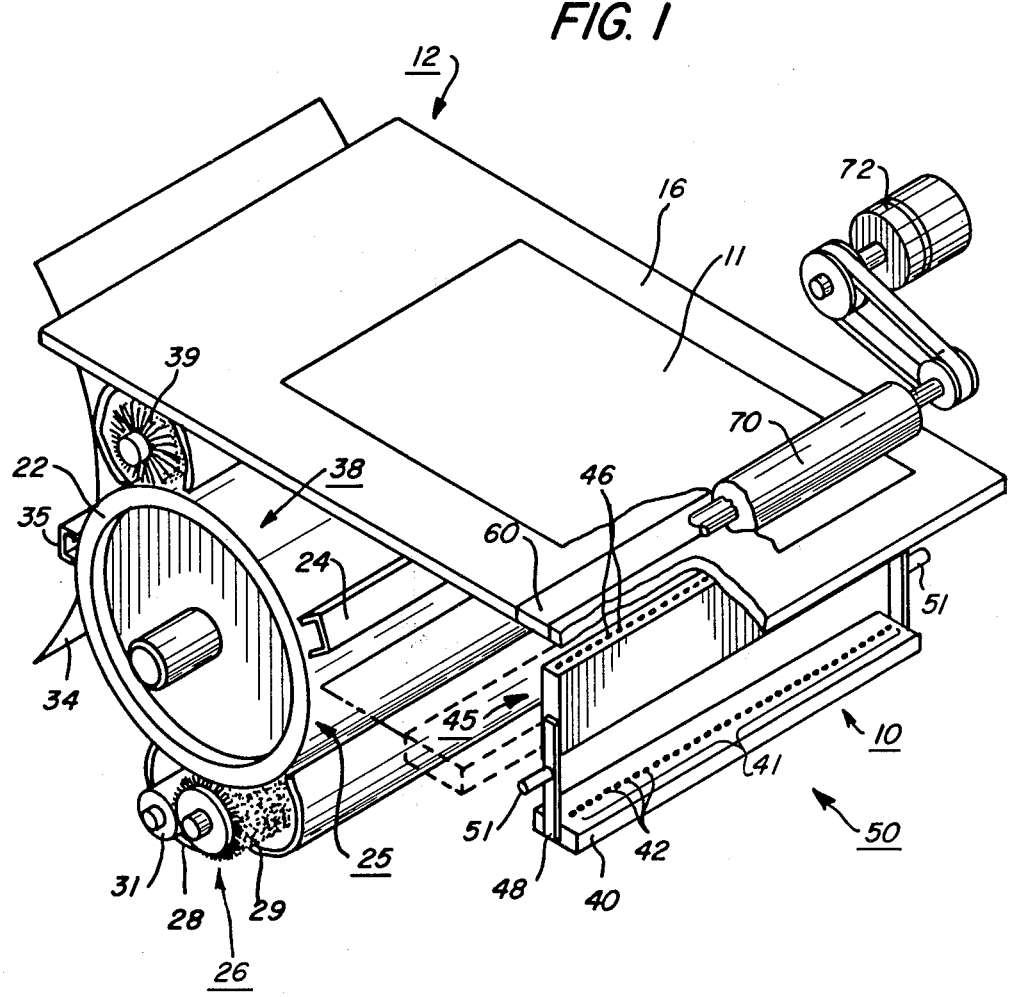
FIG. 1 is an isometric view of a multi-mode reproduction machine incorporating the read/write bar of the present invention.
Figure 2:
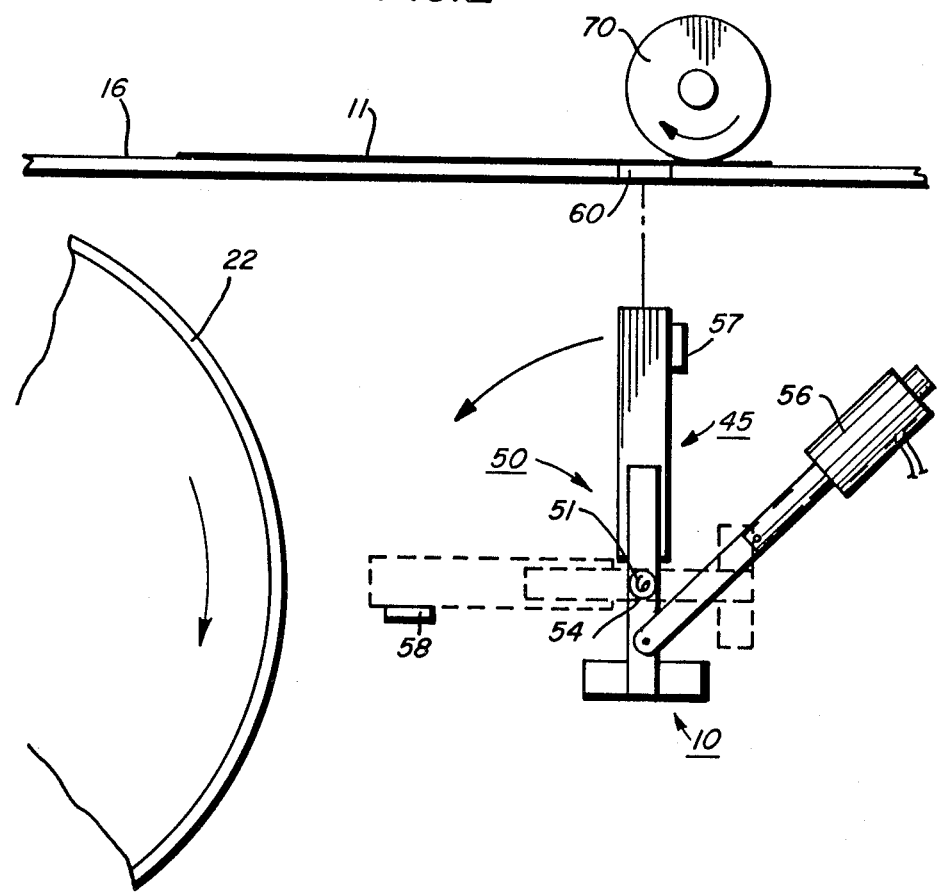
FIG. 2 is a plan view showing details of the multi-mode reproduction machine of FIG. 1.

Referring to FIGS. 1 and 2, the dual function image read/write bar of the present invention, designated generally by the numeral 10, is thereshown in combination with a multi-mode copier or reproduction machine 12. As will appear, reproduction machine 12 is operable in a READ mode to scan a document original 11 disposed on viewing platen 16 and convert the document image to electrical signals or pixels, in a WRITE mode to expose imaging member 20 thereof in accordance with an image signal input to create image copies or reproductions. Reproduction machine 12 is a xerographic based system in which the imaging member 20 comprises a photoreceptor 22 in the form of a drum supported for rotation in a suitable housing or enclosure (not shown). A suitable motor (not shown) rotates drum 22 in the direction shown by the solid line arrow during operation of reproduction machine 12. A suitable corona charging device or corotron 24 is disposed in operative relationship with photoreceptor 22, corotron 24 serving to place a uniform electrostatic charge on photoreceptor drum 22 preparatory to exposure thereof.

Photoreceptor 22 is exposed at an exposure station 25 downstream of corotron 24 in a manner to be more fully described hereinbelow, such exposure creating a latent electrostatic image on the surface of photoreceptor 22. Following exposure, the latent electrostatic image on photoreceptor 22 is developed by a suitable developer 26 illustrated herein as a magnetic brush developing roll 27. Magnetic brush developing roll 27 is rotatably disposed at a suitable developer housing 28, the lower portion of which forms a sump or reservoir 29 for a supply of developer material. A suitable developer loading device illustrated herein as a donor roll 31 serves to draw developer from sump 29 and load the same onto developing roll 27, the magnetic forces generated by suitable magnets internal of developing roll 27 (not shown) serving to attract and hold at least a portion of the developer material on the exterior surface of developing roll 27. As will be understood by those skilled in the xerographic arts, developer material may comprise a mixture of relatively large carrier beads and relatively smaller toner or ink particles, the toner adhering to and being carried on the relatively larger carrier beads through electrostatic forces. On disposition of developer material into operative relationship with photoreceptor 22, toner is attracted to the latent electrostatic image on the photoreceptor from developing roll 27 in proportion to the electrostatic forces to render the latent electrostatic image on photoreceptor 22 visible.

Following development of the latent electrostatic image, the developed image is carried by photoreceptor 22 to transfer station 33 whereat the developed image is transferred from photoreceptor 22 to a suitable copy substrate material shown here as a sheet 34 of copy paper brought forward by a suitable copy sheet feeder 36 in timed relation to arrival of the developed image on photoreceptor 22 at transfer station 33. To facilitate transfer, a transfer corotron 35 is disposed opposite the photoreceptor at transfer station 33. The copy sheet 34 bearing the developed image is carried to a suitable fusing or fixing device (not shown) where the toner image is permanently adhered to the copy sheet 34. A cleaning station 38 downstream of transfer station 33 serves to remove any leftover developing material on the photoreceptor 22 prior to making the next image. In the exemplary copier shown, a cleaning brush 39 is provided at cleaning station 38 for this purpose.

Image read/write bar 10 comprises an elongated generally rectangular base or substrate 40, having an array of individual elements such as Light Emitting Diodes 42 (LEDs herein) arranged in a linear row 41 thereacross. Preferably, the width of substrate 40 in a cross scan direction (the X direction) is such that the length of the row 41 of LEDs 42 is substantially equal to the effective width of the photoreceptor 22. LEDs 42 are preferably integrated into and fabricated with LED control 75 (shown in FIG. 3) on substrate 40 to form a unitary structure, the number of LEDs 42 per increment of length of substrate 40 being determinative of the image resolution achieved.

A linear array lens 45 of gradient optical fibers or fiber lenses 46 is provided, there being one optical fiber 46 for each LED 42 on read/write bar 10. Lens array 45 is disposed in predetermined spaced relationship to the surface of read/write bar 10 and LEDs 42, the optical fibers 46 of lens array 45 being optically aligned with the LEDs 42 associated therewith. Optical fibers of the type referred to herein are produced under the tradename "SELFOC," registered in Japan and owned by Nippon Sheet Glass Co., Ltd. To assure a predetermined spatial relationship between read/write bar 40 and lens array 45, suitable frame elements 48 are used to rigidly couple read/write bar 40 with lens array 45 to form a combined read/write bar-lens array structure 50. To enable the read/write bar-lens array structure 50 to be selectively moved between read and write positions as will appear, the read/write bar-lens array 50 is supported for pivotal movement as by means of pins 51 between photoreceptor 22 and a slit-like document scanning aperture 60 in an adjoining document supporting platen 16. One or more torsion type springs 54 serve to bias the structure 50 to one position (illustrated herein as the image read position). A suitable operator such as solenoid 56 is drivingly coupled to the read/write bar-lens array structure 50, solenoid 56 being operative when energized to rotate the structure 50 through an arc of approximately 90° to place the read/write bar-lens array structure 50 to a second write position. Adjustable stops 57, 58 limit rotation of the structure 50 and permit preadjustment of the position of the structure 50 in proper axial alignment with scan aperture 60 and exposure station 25 for optimum operation in both the read and write modes.

Platen 16 forms a relatively flat or planar surface 64 for supporting the document 11 to be scanned, scanning taking place through the slit-like scanning aperture 60 in platen 16. The longitudinal axis of scanning aperture 60 extends in a direction paralleling the scan axis of read/write bar 10 (i.e. the X direction), the longitudinal dimension of aperture 60 being equal to or slightly greater than the length of the LED row 41 while the dimension of the aperture 60 along the scan axis (the Y direction) is sufficient to permit at least one line of the document to be viewed at a time by read/write bar 10.

To advance the document 11 to be scanned across platen 16 and scanning aperture 60, a suitable feeder illustrated herein as a constant velocity transport (CVT) document feed roll 70 is provided. Platen 16 and feed roll 70 cooperate to form a nip between which the document is fed. Document feed roll 70, which is preferably disposed adjacent one edge of aperture 60, is driven by a suitable motor such as step motor 72.

Figure 3:
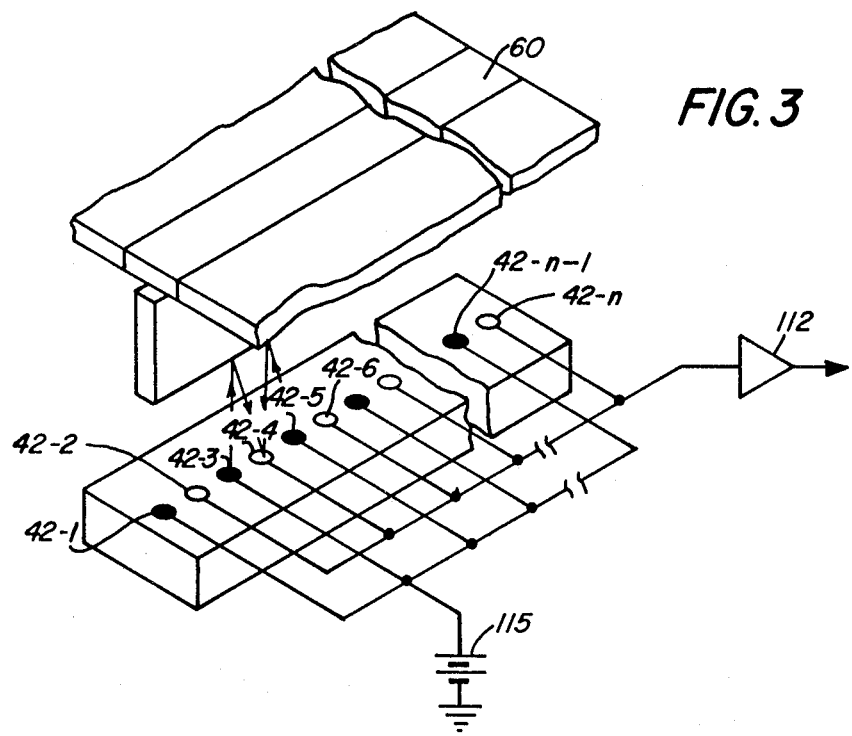
FIG. 3 is a schematic view illustrating the preferred illumination/read sequence for the read/write elements that comprise the read/write bar of the present invention.

Referring now to FIG. 3, during operation in the READ mode, read/write bar 10 functions as both a scanning array to read the portion of document opposite scanning aperture 60 and as an illumination source for illuminating scanning aperture 60 and the portion of the document 11 thereover. To effectuate this and in a preferred embodiment, alternate LEDs 42-1, 42-3, ... 42-N-1 are coupled to a suitable voltage source 115 such that LEDs 42-1, 42-3, ... 42-N-1 are energized continuously during operation in the READ mode to illuminate aperture 60 and the portion of document thereover. The remaining LEDs 42-2, 42-4, ... 42-N function as light detectors to scan the portion of the document 11 illuminated by LEDs 42-1, 42-2, ... 42-N-1 and convert the image portion viewed to electrical signals or pixels representative of the image grey levels.

Figure 4:
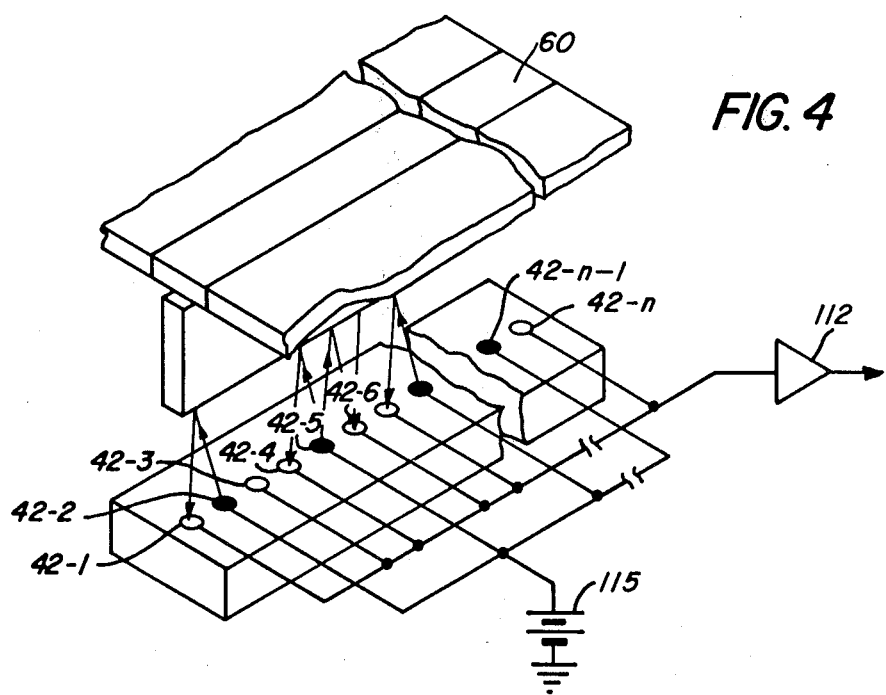
FIG. 4 is a schematic view illustrating an alternate illumination/read sequence for the read/write elements that comprise the read/write bar of the present invention.

Other LED illumination sequences may be envisioned as for example that shown in the embodiment of FIG. 4 where one LED (42-2, 42-5, ... 42-N-1) serves to provide illumination for the LEDs (42-1, 42-3; 42-4, 42-6; ... 42-N-2, 42 N) on either side thereof.

During operation in the WRITE mode, the entire row 41 of LEDs 42 are utilized as selectively actuatable light sources to expose the photoreceptor 22, the individual LEDs actuated at any one time being a function of the image signal input.

Figure 5:
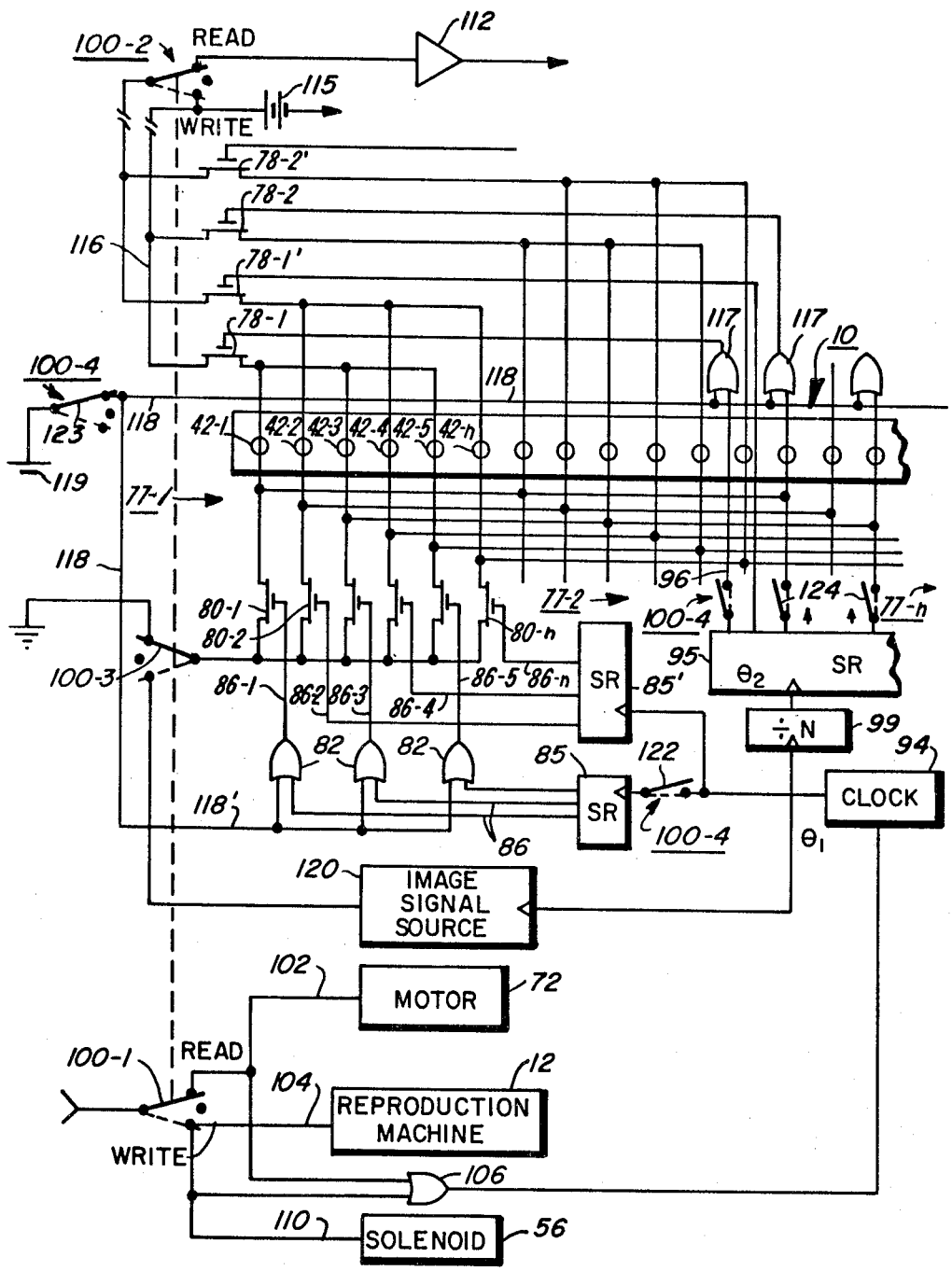
FIG. 5 is a logic schematic of the control system for the multi-mode reproduction machine shown in FIG. 1.
Figure 6:
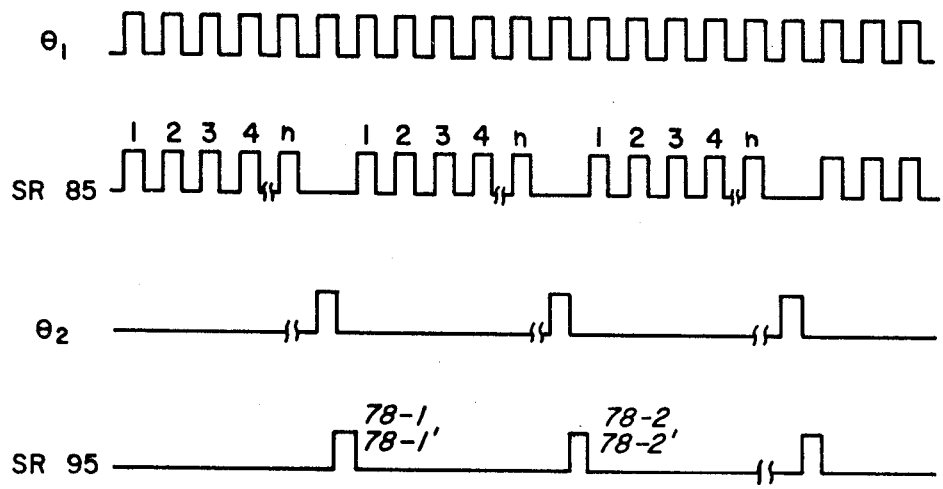
FIG. 6 is a timing diagram illustrating the operating sequences for the read/write bar of FIG. 1 in WRITE mode.

Referring particularly to FIG. 5, an LED control 75 is provided for operating the machine 12 in either the image READ or WRITE mode. LED control 75 comprises a matrix system for selectively operating LEDs 42 as appropriate in either read the document 11 or write images on photoreceptor 22. Pursuant thereto, LEDs 42 are segregated into groups 77-1, 77-2, ... 77-N of an equal number of LEDs each, with a pair of group control switches 78-1, 78-1'; 78-2, 78-2'; ... 78-N, 78-N' for every other LED that comprises each LED group 77-1, 77-2, ... 77-N. Individual LED control switches 80-1, 80-2, ... 80-N are provided, the number of control switches being equal to the number of LEDs that comprise the read/write bar 10.

A pair of LED control shift registers 85, 85' have successive output stages coupled through OR function gates 82 and control lines 86-1, 86-3, ... 86-N-1 and 86-2, 86-4, ... 86-N respectively to the control terminals of LED control switches 80-1, 80-3, . . . 80-N-1 and 80-2, 80-4, . . . 80-N respectively. Shift registers 85, 85' control actuation of the LED control switches 80-1, 80-2, . . . 80-N in timed sequence in response to clock signals $\theta$ output by a clock 94 during the image WRITE mode and LED control switches 80-2, 80-4, . . . 80-N only during the image READ mode. During the image READ mode, LED control switches 80-1, 80-3, . . . 80-N-1 are held activated to permit LEDs 42-1, 42-3, . . . 42-N-1 to be continuously energized to illuminate the document being scanned.

A LED group control shift register 95 has successive output stages thereof coupled to LED group control switches 78-1, 78-1'; 78-2, 78-2', . . . 78-N, 78-N', control signals output by shift register 95 serving to actuate LED group control gates 78-1, 78-1', 78-2, . . . 78-N in timed succession to enable the individual LED groups 77-1, 77-2, . . . 77-N associated therewith. LED group control shift register 95 is driven by clock signals $\theta_2$ which are a fraction of the clock signals $\theta_1$ used to control actuation of the individual LED control switches 80-1, 80-2, . . . 80-N. Clock signals $\theta_2$ are derived from clock signals $\theta_1$ through divide by n circuit 99, it being understood that the ratio of clock pulses $\theta_1$ to $\theta_2$ and the setting of divide by n circuit 99 is proportional to the number of LEDs 42 in each LED group 77-1, 77-2, . . . 77-n.

A suitable multi-section mode selector, illustrated herein in the form of switch 100, is provided to permit the operator or user to select the operating mode desired, either READ or WRITE mode. Section 100-1 of selector switch 100 controls energization of document feeder motor 72 and reproduction machine 12 through lines 102, 104 respectively, and clock 94 through OR function gate 106. Additionally, selector switch section 100-1 controls operation of solenoid 56 through line 110. Selector switch section 100-2 couples LED group control switches 78-1', 78-2', . . . 78-N' to the image signal output line 112 when the image READ mode is selected and couples LED group control switches 78-1', 78-2', . . . 78-N' to voltage source 115 when the image WRITE mode is selected. LED group control switches 78-1, 78-2, . . . 78-N are coupled to voltage source 115 through line 116. Selector switch section 100-3 selectively couples the other side of LED circuit 75 to either ground or a suitable source of video image signals designated herein by the numeral 120. As will be understood by those skilled in the art, image signal output line 112 may be coupled to any suitable image user such as a memory, communication channel, etc. Similarly, image signal source 120 may comprise memory, communication channel, image reader, etc.

To permit LEDs 42-1, 42-3, . . . 42-N-1 to be operated continuously during the image READ mode and serve as the source of document illumination for the remaining LEDs 42-2, 42-4, . . . 42-N of read/write bar 10, OR function gates 117 are provided in the control line to LED group control switches 78-1, 78-2, . . . 78-N, one input terminal of gates 117 being coupled to alternate output stages of shift register 95 through line 96 and switches 124 of selector switch section 100-4, and the other input terminal being coupled by line 118 through switch 123 of selector switch section 100-4 to a suitable steady state signal source 119.

OR function gates 82 are provided in the control lines to LED control gates 80-1, 80-3, 80-N-1, gates 82 having one input coupled by lines 86 to the output side of shift register 85' while the other input terminal of gates 82 is coupled by line 118' to the output side of selector switch section 100-4. Switch 122 of selector switch section 100-4 is provided in the clock line to shift register 85.

OPERATION

Referring to FIGS. 1–6, where operation in the READ mode is desired, selector switch 100 is set to the solid line position shown in the drawings. In this operational mode, LEDs 42-2, 42-4, . . . 42-N function as light detectors to output an electrical signal or pixel, the potential of which reflects the grey level of the image portion viewed while LEDs 42-1, 42-3, . . . 42-N-1 function as light sources to illuminate the portion of document 11 opposite scanning aperture 60. In this setting, selector switch section 100-1 enables document feed motor 72 so that on a demand for image signals, the document 11 is moved across scanning aperture 60. It is understood that the document 11 to be scanned is previously inserted into the nip formed by roll 70 and platen 16. Clock 94 is enabled to scan LEDs 42-2, 42-4, . . . 42-N of read/write bar 10. Selector switch section 100-2 couples LED group control switches 78-1', 78-2', . . . 78-N' to image signal output line 112 while selector switch section 100-3 couples LED circuit 75 to ground. Selector switch section 100-4 couples (through gates 117) the control terminals of LED group control switches 78-1, 78-2, . . . 78-N and (through gates 82) LED control switches 80-1, 80-3, . . . 80-N to signal source 119. As a result, LED group control switches 78-1, 78-3, . . . 78-N and LED control switches 80-1, 80-3, . . . 80-N are actuated to couple LEDs 42-1, 42-3, . . . 42-N to voltage source 115 to energize LEDs 42-1, 42-3, . . . 42-N and illuminate scanning aperture 60 and the portion of document 11 thereover. Concurrently, switches 122, 124 of selector switch section 100-4 interrupts the clock signal input line to shift register 85 and the clock signal output lines 96 of register 95 to gates 117.

It is understood that LED lens array 50 is normally disposed in the solid line position shown, springs 54 serving to retain LED lens array 50 against locating stop 57 so that the individual LEDs 42 on read/write bar 10 are focused by lens array 45 onto the scan aperture 60 and the document portion thereover.

On demand for image signals following insertion of the document to be scanned into the nip formed by document feed roll 70 and platen 16, clock signals $\theta_1$ from clock 94 operate LEDs 42-2, 42-4, . . . 42-N of read/write bar 10 to scan the document 11 line by line as the document is moved past scanning aperture 60 by roll 70, the clock pulses $\theta_1$ driving LED control shift register 85' and LED group control shift register 95 to successively couple LEDs 42-2, 42-4, . . . 42-N to output line 112, shift register 85' repeatedly actuating in succession individual LED control switches 80-2, 80-4, . . . 80-N while shift register 95 successively enables LED groups 77-1, 77-2, . . . 77-N in synchronism therewith to sample LEDs 42-2, 42-4, . . . 42-N across the scan line. It is understood that the remaining LEDs 42-1, 42-3, 42-N-1 of LED row 41 are energized continuously during this process to illuminate the document portion being scanned. The above process is repeated as each line of the document 11 is moved past scanning aperture 60 until scanning of the entire document 11 is completed at which time selector switch 100 may be set to the inoperative or neutral position.

Where it is desired to operate in the WRITE mode, selector switch 100 is moved to the dotted line position. In this operating mode, LEDs 42 function as individually controlled light emitters effective to selectively expose photoreceptor 22 line by line in accordance with an image signal input. In this position, selector switch section 100-1 enables reproduction machine 12 and clock 94, the latter to operate read/write bar 10 as will appear. At the same time switch section 100-1 actuates solenoid 56 to move the read/write bar-lens array structure 50 through an arc of approximately 90° to the dotted line position shown wherein the row 41 of LEDs 42 on read/write bar 10 are focused onto photoreceptor 22 of reproduction machine 12 at imaging station 25. Selector switch sections 100-2 and 100-3 couple LED control 75 between voltage source 115 and image signal source 120 while switch 123 of selector switch section 100-4 interrupts input of the control signal from signal source 119 to circuits 82, 117. Switches 122, 124 of switch section 100-4 couple the output of clock 94 to shift register 85 and the output stages of shift register 95 to the control gates of LED group control switches 78-1, 78-2, ... 78-N.

On input of image signals from image signal source 120, reproduction machine 12 and read/write bar 10 are actuated, LEDs 42 selectively exposing the charged photoreceptor 22 in accordance with the image signal output of signal source 120 to form a latent electrostatic image on photoreceptor 22. The image is developed by developer 26 and transferred to the copy sheet 34 at transfer station 33. In this mode, image signals from image signal source 120 are applied in succession to individual LEDs 42 of read/write bar 10 through LED control switches 80-1, 80-2, ... 80-n on an LED group by group basis as determined by LED group control switches 78-1, 78-1'; 78-2, 78-2'; ... 78-N; 78-N'. The selective actuation of LEDs 42 in accordance with the image signal content of the image signal output of signal source 120 creates a latent electrostatic image as described on photoreceptor 22 as described.

Figure 7:
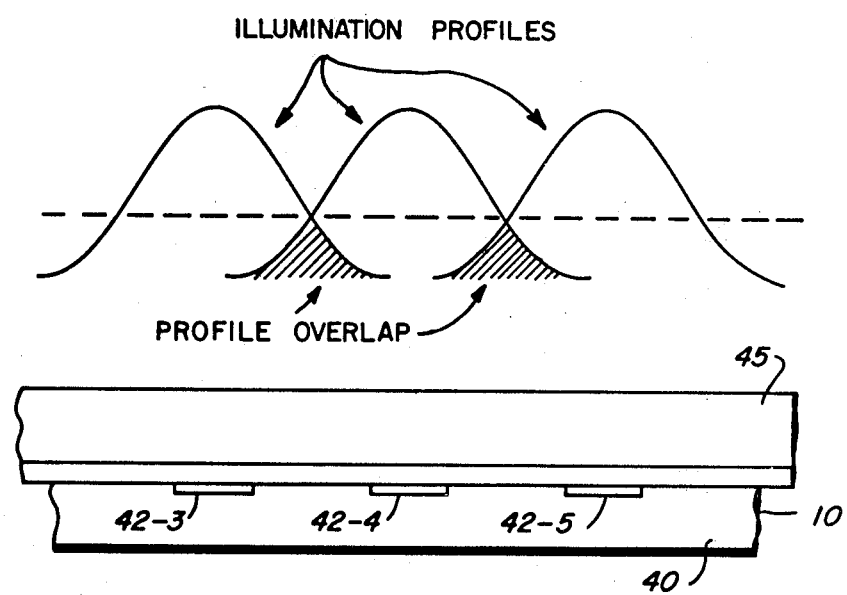
FIG. 7 is a schematic view showing the illumination profile during the image READ mode for the read/write bar of FIG. 3.

In FIG. 7, an exemplary illumination profile is illustrated for the read/write bar 10 operating in the READ mode in accordance with the embodiment of FIGS. 1-3, 5 and 6. As is illustrated there, substantially uniform illumination is achieved to illuminate the document line for scanning purposes.

While a single row 41 of LEDs 42 is disclosed herein, multiple parallel LED rows may be envisioned for reading and for writing multiple lines. In that event, during operation in the READ mode, the illuminating LEDs of one row may provide additional light for the reading LEDs of an adjacent row or rows which may be enhanced by changing, i.e. reversing the LED operating order. Further, the LEDs of one row may be axially offset from the LEDs of an adjacent row to enhance image reading and writing resolution, it being understood in the event that each LED row would process a portion of each line.

While the invention has been described with reference to the structure disclosed, it is not confined to the details set forth, but is intended to cover such modifications or changes as may come within the scope of the following claims.

We claim:

1. Combined document reading, illuminating, and writing means for either scanning a document to provide image signals representative of the document image or scanning an imaging member to expose said imaging member in accordance with an image signal input to write images represented by said image signal input on said imaging member, comprising in combination:
    (a) a substrate;
    (b) plural light emitting and light sensing scanning elements on said substrate, said scanning elements being arranged on said substrate in at least one linear array capable of either scanning a document or scanning said imaging member; and
    (c) control means for operating first ones of said elements as light emitters for illuminating a line-like portion of said document and the remaining second ones of said elements as image sensors for scanning said document illuminated portion and converting the document image to image signals or for operating said first and second ones of said elements as selectively actuable light emitters for exposing said imaging member in accordance with said image signal input.

2. The combined reading, illuminating, and writing means according to claim 1 in which said scanning elements comprise light emitting diodes.

3. The combined reading, illuminating, and writing means according to claim 1 in which the length of said array of scanning elements is at least equal to the effective width of said imaging member.

4. The combined reading, illuminating, and writing means according to claim 1, 2, or 3 in which said first ones of said scanning elements comprises alternate ones of said array of scanning elements.

5. The combined reading, illuminating, and writing means according to claim 1 in which said remaining second ones of said elements comprise every third one of said array of scanning elements.

6. Combined image reading and writing means for use with raster scanning apparatus of the type having a viewing station where a document original may be read and converted to electrical signals, and an imaging member on which an image may be written in response to an image signal input, comprising in combination:
    (a) a generally rectangular substrate, the length of said substrate being sufficient to permit said substrate to span across said apparatus viewing station and imaging member;
    (b) plural combination light emitting and light sensing scanning elements on said substrate, said scanning elements being arranged on said substrate so as to provide at least one linear array of said scanning elements along the length of said substrate for either scanning a document original at said apparatus viewing station when reading images or scanning said apparatus imaging member when writing images, the lengthwise dimension of said array of scanning elements being at least equal to the corresponding dimension of saidapparatus viewing station and said apparatus imaging member; and
    (c) control means permitting selective actuation of said array of scanning elements to both illuminate and read a document original at said apparatus viewing station or write images on said apparatus imaging member in response to said image signal input.

7. The image reading and writing means according to claim 6 in which said control means includes first means for operating a preset number of said scanning elements as light sources to illuminate the portion of the document being read and the remainder of said scanning elements as image sensors for scanning the document and converting the document image to image signals, and second means for operating said array of scanning elements as selectively actuatable light sources for exposing said imaging member in accordance with said image signal input.

8. The image reading and writing means according to claim 6 in which said scanning elements comprise light emitting diodes.

9. The image reading and writing means according to claim 7 in which said preset number of scanning elements comprises alternate ones of said array of scanning elements.

10. A full width image reading and writing array comprising:
(a) a generally rectangular base member;
(b) plural light emitting diodes on said base member arranged to form at least one line of light emitting diodes, the length of said line of light emitting diodes being at least equal to the width of the maximum image to be processed; and
(c) switch means operable in one mode to actuate said light emitting diodes individually to write an image line by line and operable in a second mode to actuate predetermined ones of said light emitting diodes to illuminate the image to be read while actuating the remaining one of said light emitting diodes to read said illuminated image.

11. The array according to claim 10 in which said predetermined ones of said light emitting diodes comprise every second light emitting diode in said line of light emitting diodes.

12. The array according to claim 10 in which said predetermined ones of said light emitting diodes comprise two out of every three of said light emitting diodes in succession in said line of light emitting diodes.

13. In a raster scanning apparatus having a viewing station where a document is scanned to provide image signals representative thereof, and an imaging member which is scanned and selectively exposed in accordance with an image signal input to write images thereon, the improvement comprising:
(a) a generally rectangular substrate;
(b) at least one array of scanning elements on said substrate, said scanning elements being operable in either a first mode where said scanning elements act as independently controlled light sources for writing images on said imaging member or a second mode where a predetermined number of said scanning elements act as light detectors for reading the document image at said viewing station; and
(c) control means operable in said first mode to condition said scanning elements to act as light sources whereby to enable images to be writen on said apparatus imaging member through selective actuation of said scanning elements in accordance with said image signals input, said control means being operable in said second mode to condition said predetermined scanning elements to act as light detectors whereby to enable said document to be read at said apparatus viewing station and the document image converted to image signals while conditioning the remaining ones of said scanning elements to act as light sources for illuminating said document at said viewing station.

14. The apparatus according to claim 13 in which said predetermined scanning elements comprises every other one of said scanning elements.

15. The apparatus according to claim 13 in which said remaining ones of said scanning elements comprises every third scanning element in said array.

16. A dual function raster scanning apparatus capable of reading a document original to convert the document original to image signals or of writing duplicate images in response to image signals, comprising in combination:
(a) a platen for supporting document originals to be read;
(b) an imaging member on which duplicate images may be formed in response to image signals;
(c) an image read/write bar having plural dual function image read and write elements, said image read and write elements being arranged in at least one longitudinally extending row so as to form a full width scanning array enabling scanning of an entire line at once; and
(d) means for controlling operation of said image read and write elements to simultaneously illuminate and scan document originals on said platen to convert the document image to image signals or to expose said imaging member in response to image signals to write a duplicate image on said imaging member.

17. The apparatus according to claim 16 in which said controlling means operates a preset number of said image read and write elements to illuminate said platen and the document original thereon while operating the remaining ones of said image read and write elements to scan the document original illuminated on said platen.

18. The apparatus according to claim 17 including a lens array for focusing said image read and write elements on said platen and said imaging member, said lens array comprising a plurality of lens means arranged in at least one longitudinally extending array and providing an individual lens means for each of said image read and write elements; and means positioning said lens array in predetermined operating position with said read/write bar and said image read and write elements thereof.

19. The apparatus according to claim 18 including
means supporting said read/write bar and said lens array for movement between a read position where said image read and write elements scan said platen and the document original thereon and a write position where said image read and write elements scan said imaging member.

* * * * *